US011146399B2

(12) United States Patent
Westland et al.

(10) Patent No.: US 11,146,399 B2
(45) Date of Patent: Oct. 12, 2021

(54) METHODS AND SYSTEMS FOR RETRIEVING ZERO-KNOWLEDGE PROOF-CLOAKED DATA ON DISTRIBUTED LEDGER-BASED NETWORKS

(71) Applicant: EYGS LLP, London (GB)

(72) Inventors: Duncan James Westland, Addlestone (GB); Chaitanya Reddy Konda, London (GB); Paul Richard Brody, Woodside, CA (US)

(*) Notice: Subject to any disclaimer, the term of this patent is extended or adjusted under 35 U.S.C. 154(b) by 302 days.

(21) Appl. No.: 16/447,686

(22) Filed: Jun. 20, 2019

(65) Prior Publication Data

US 2020/0127834 A1 Apr. 23, 2020

Related U.S. Application Data

(60) Provisional application No. 62/748,002, filed on Oct. 19, 2018.

(51) Int. Cl.
*H04L 9/32* (2006.01)
*H04L 9/30* (2006.01)
(Continued)

(52) U.S. Cl.
CPC ........ *H04L 9/3221* (2013.01); *G06F 16/9027* (2019.01); *H04L 9/0637* (2013.01);
(Continued)

(58) Field of Classification Search
CPC ... H04L 9/3221; H04L 9/0637; H04L 9/0643; H04L 9/0825; H04L 9/30; H04L 9/3213; H04L 9/3218; G06F 16/9027
See application file for complete search history.

(56) References Cited

U.S. PATENT DOCUMENTS 9,397,985 B1 7/2016 Seger, II et al.
9,608,829 B2 3/2017 Spanos et al.
(Continued)

FOREIGN PATENT DOCUMENTS

CN 107274184 A 10/2017
WO WO 2017/187395 11/2017
(Continued)

OTHER PUBLICATIONS

Andreev, O., "Hidden in Plain Sight: Transacting Privately on a Blockchain. Introducing Confidential Assets in the Chain Protocol," [Online], Retrieved from the Internet: <URL: https://blog.chain.com/hidden-in-plain-sight-transacting-privately-on-a-blockchain-835ab7 . . . ], Retrieved on Aug. 27, 2018, 11 pages.
(Continued)

*Primary Examiner* — Noura Zoubair
(74) *Attorney, Agent, or Firm* — Cooley LLP

(57) ABSTRACT

One or more embodiments described herein disclose methods and systems that are directed at facilitating access to and retrieval of data concealed on a distributed ledger-based network (DLN) with the use of zero-knowledge proof (ZKP) techniques. The methods and systems allow for the encryption, using an encryption key, of data related to a transaction between participants of the DLN, the encryption of the encryption key using a public key of an auditor of the transaction, and the generation of a ZKP that the encryption key used to encrypt the data corresponds to the encryption key encrypted using the public key such that the encrypted encryption key and/or the encrypted data are available to the auditor after the ZKP is verified by a self-executing code segment of the DLN. The ZKP also includes a proof that the encrypted data includes the transaction data.

20 Claims, 2 Drawing Sheets

(51) Int. Cl.
*H04L 9/08* (2006.01)
*G06F 16/901* (2019.01)
*H04L 9/06* (2006.01)

(52) U.S. Cl.
CPC .......... *H04L 9/0643* (2013.01); *H04L 9/0825* (2013.01); *H04L 9/30* (2013.01); *H04L 9/3213* (2013.01); *H04L 9/3218* (2013.01); *H04L 2209/38* (2013.01)

(56) References Cited

U.S. PATENT DOCUMENTS

| | | | |
|---|---|---|---|
| 9,785,369 | B1 | 10/2017 | Ateniese et al. |
| 9,794,074 | B2 | 10/2017 | Toll et al. |
| 9,870,508 | B1 | 1/2018 | Hodgson et al. |
| 9,881,176 | B2 | 1/2018 | Goldfarb et al. |
| 9,906,513 | B2 | 2/2018 | Wuehler |
| 9,942,231 | B1 | 4/2018 | Laucius et al. |
| 9,948,467 | B2 | 4/2018 | King |
| 9,959,065 | B2 | 5/2018 | Ateniese et al. |
| 10,026,118 | B2 | 7/2018 | Castinado et al. |
| 2016/0260169 | A1* | 9/2016 | Arnold ............... G06Q 40/12 |
| 2016/0358165 | A1* | 12/2016 | Maxwell ............ G06Q 20/0655 |
| 2017/0091750 | A1 | 3/2017 | Maim |
| 2017/0278100 | A1 | 9/2017 | Kraemer et al. |
| 2017/0293503 | A1 | 10/2017 | Curtis |
| 2017/0346639 | A1 | 11/2017 | Muftic |
| 2018/0048461 | A1 | 2/2018 | Jutla et al. |
| 2018/0101701 | A1 | 4/2018 | Barinov et al. |
| 2018/0139043 | A1 | 5/2018 | Jayachandran et al. |
| 2018/0165131 | A1 | 6/2018 | O'Hare et al. |
| 2018/0189753 | A1 | 7/2018 | Konda et al. |
| 2018/0218176 | A1 | 8/2018 | Voorhees et al. |
| 2019/0012662 | A1* | 1/2019 | Krellenstein ......... G06Q 40/04 |
| 2019/0034923 | A1* | 1/2019 | Greco ................. G06Q 20/383 |
| 2020/0059361 | A1 | 2/2020 | Konda et al. |
| 2020/0059362 | A1 | 2/2020 | Brody et al. |
| 2020/0059364 | A1 | 2/2020 | Konda et al. |

FOREIGN PATENT DOCUMENTS

| | | |
|---|---|---|
| WO | WO 2018/007828 | 1/2018 |
| WO | WO 2018/028777 | 2/2018 |
| WO | WO 2018/144302 | 8/2018 |

OTHER PUBLICATIONS

Parno, B. et al., "Pinocchio: Nearly practical verifiable computation," S&P (2013), 16 pages.
Groth, J. et al., "Snarky signatures: Minimal signatures of knowledge from simulation-extractable SNARKs," In: Katz, J., Shacham, H. (eds.) CRYPTO 2017. LNCS, vol. 10402, pp. 581-612. Springer, Cham (2017).
Ben-Sasson, E. et al., "Scalable, transparent, and post-quantum secure computational integrity," Cryptology ePrint Archive, Report 2018/046 (2018), 83 pages.
Wu, H., "DIZK: Distributed zero-knowledge proof systems," In USENIX Security (2018), 35 pages.
Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).
Zhang, Y. et al., "Z-Channel: Scalable and efficient scheme in zerocash," 2017, [Online], Retrieved from the Internet: https://eprint.iacr.org/2017/684, pp. 1-39.
International Search Report and Written Opinion for International Application No. PCT/US2019/046532, dated Dec. 2, 2019, 9 pages.
International Search Report and Written Opinion for International Application No. PCT/US2019/046808, dated Dec. 2, 2019, 10 pages.
Kosba, A. et al., "Hawk: The Blockchain Model of Cryptography and Privacy-Preserving Smart Contracts," 2016 IEEE Symposium on Security and Privacy, May 2016, pp. 839-858.
Office Action for U.S. Appl. No. 16/283,452, dated Nov. 6, 2019, 34 pages.
Office Action for U.S. Appl. No. 16/283,452, dated Jul. 10, 2019, 31 pages.
Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.
International Search Report and Written Opinion for International Application No. PCT/US2019/057246, dated Feb. 4, 2020, 9 pages.
International Search Report and Written Opinion for International Application No. PCT/US2019/057262, dated Jan. 24, 2020, 10 pages.
Lee, C. H. et al., "Implementation of IoT system using blockchain with authentication and data protection," 2018 International Conference on Information Networking (ICOIN), IEEE, Jan. 10, 2018, pp. 936-940.
Menezes, A. et al., "Key Management Techniques," Chapter 13 in Handbook of Applied Cryptography, CRC Press, Boca Raton, FL, (1996), pp. 543-590.

* cited by examiner

METHODS AND SYSTEMS FOR RETRIEVING ZERO-KNOWLEDGE PROOF-CLOAKED DATA ON DISTRIBUTED LEDGER-BASED NETWORKS

CROSS-REFERENCE TO RELATED PATENT APPLICATION

This application claims priority to and the benefit of U.S. Provisional Application No. 62/748,002, filed Oct. 19, 2018, entitled "Methods and Systems of ZKP-Based Secure Private Enterprise Transactions on Public Networks," the disclosure of which is incorporated herein by reference in its entirety.

FIELD OF THE DISCLOSURE

Distributed ledger-based networks (DLNs) employ consensus-based verification mechanisms for validating actions occurring on the DLNs, which may compromise the confidentiality of the actions as relevant information has to be shared across the DLNs for actions to be validated. In some embodiments, zero-knowledge proofs (ZKPs) can be used to cloak or conceal private data used or generated during transactions occurring in the DLNs. The instant disclosure discloses methods and systems that facilitate access to and retrieval of the concealed data.

BACKGROUND

Individuals as well as organizations can use private networks, as well as public networks such as the internet and distributed ledger-based networks (DLNs) to manage and track transactions between the individuals or the organizations and the individuals. The use of private networks, however, can be inefficient and costly, while public networks may not provide the desired level of privacy and/or security. For example, public DLNs can expose, by virtue of being public networks, details of private interactions occurring on the networks.

SUMMARY

Figure 1:
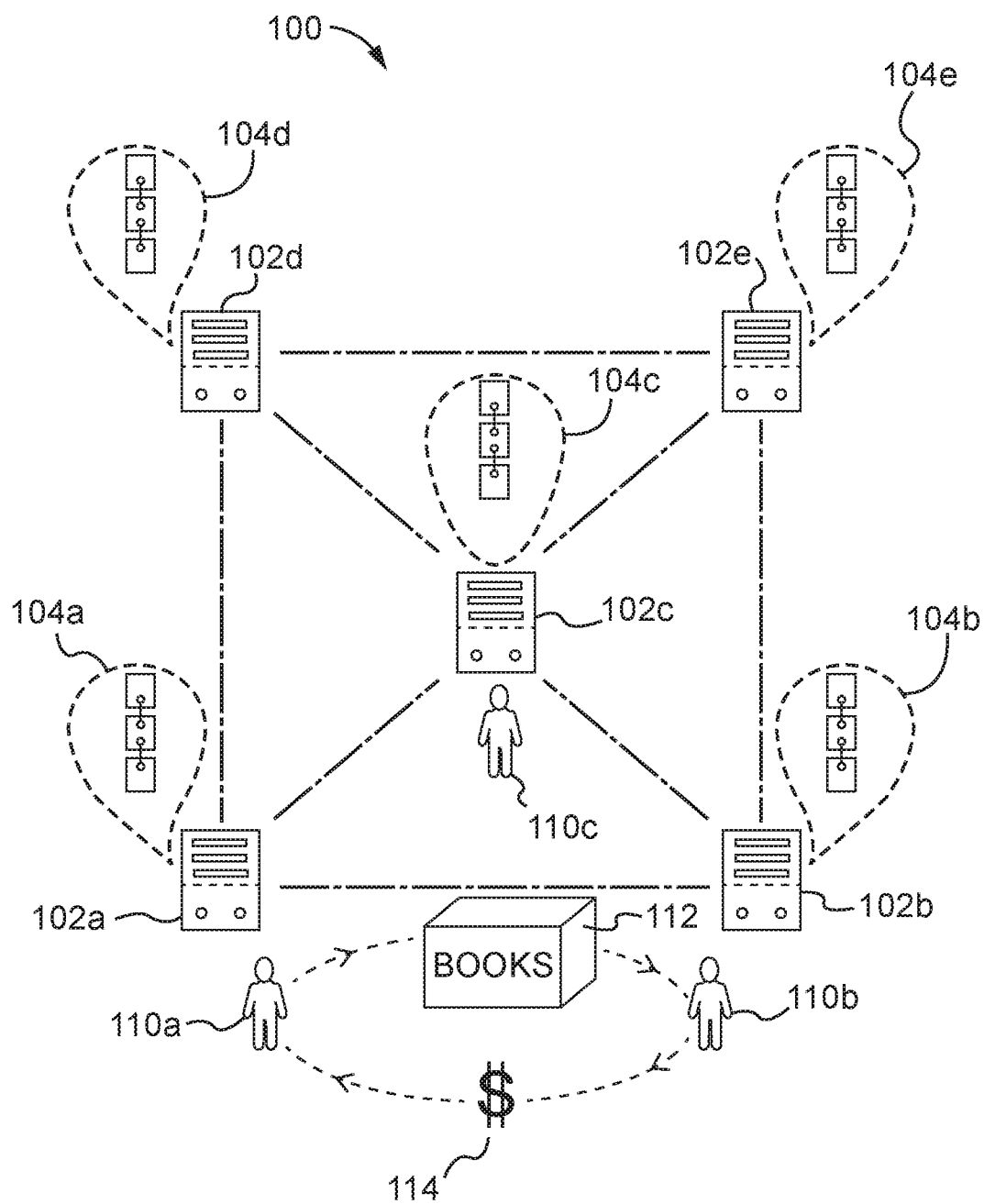
FIG. 1 shows a schematic illustration of the access and retrieval of data concealed using zero-knowledge proof techniques on a distributed ledger-based network, according to some embodiments.

In some embodiments, methods and systems facilitate access to and retrieval of data concealed on a distributed ledger-based network (DLN) with the use of zero-knowledge proof (ZKP) techniques. For example, some embodiments comprise encrypting, using an encryption key, data related to a transaction between a first party and a second party to generate an encrypted data, the transaction represented on a zero-knowledge proof (ZKP)-enabled distributed ledger-based network (DLN); encrypting the encryption key using a public key retrieved from the ZKP-enabled DLN to generate an encrypted encryption key, the public key associated with an auditor assigned to audit the transaction; and providing to a self-executing code segment on the ZKP-enabled DLN a ZKP that the encryption key used to encrypt the data corresponds to the encryption key encrypted using the public key such that the encrypted encryption key and/or the encrypted data are available to the auditor after the ZKP is verified by the self-executing code segment

DETAILED DESCRIPTION

In some embodiments, parties participating in a transaction may elect to use a public distributed ledger-based network (DLN) to document the details of the transaction and manage its operations. DLNs can provide decentralized platforms that are transparent to at least all the participants of the networks, if not to the public at large, and as such, can be viewed as consensus-based platforms that facilitate trust between transaction participants without the need for a central authority to administer the network. For example, parties participating in a transaction for a sale (e.g., private sale) of a digital music file can use a self-executing code or program (e.g., a smart contract) on the DLN to manage the sale of the music file. The self-executing code or smart contract can regulate the exchange of the music file and the correct payment (e.g., crypto-currency) for the file between the parties without involvement from a third party. In some embodiments, the DLNs can also be used to manage transactions involving physical (e.g., non-digital) assets. In some implementations, this can be accomplished by using tokens to represent the assets, and a sale of an asset can be represented by the transfer of the token representing the asset from one party (e.g., the seller) to a second party (e.g., the buyer).

In some embodiments, a DLN can be and/or support a blockchain or blockchain network. Throughout the instant disclosure, in some embodiments, the terms "distributed ledger-based network" and "blockchain network" may be used interchangeably. Similarly, in some embodiments, the terms "self-executing code" or "self-executing code segment" and "smart contract" may be used interchangeably. Further, in some embodiments, the term "transaction" may be used to refer to off-chain transactions (e.g., transactions involving the sale of physical or digital assets between parties) and/or on-chain representation of these off-chain transactions (e.g., the transaction of tokens that represent the assets on the blockchain network). Whether the term refers to the former or the latter case should be clear from context.

As noted above, in some embodiments, the trust the DLNs provide without the need for a central authority derives from the transparency of the networks to at least all the participants of the network (and in the case of public networks, to the public at large). This transparency, however, can reduce or even eliminate any privacy or confidentiality that participants need or seek when interacting with the network or its participants. For example, in the case of public distributed ledger-based networks, any interested person can access and inspect the distributed ledgers on the distributed ledger-based networks to obtain detailed information on all transactions that are represented on the ledgers since the inception of the distributed ledger-based networks (as the ledgers are, in at least most cases, largely immutable). In some implementations, the lack of privacy or confidentiality can render the use of a public ledger-based network untenable. For instance, a pharmacy using a public blockchain network to manage the fulfillment of orders for shipment of prescription drugs without a mechanism to conceal at least some aspects of the transaction would publicly expose personal and health-related data of its customers (thereby violating their privacy and possibly health privacy laws). In some embodiments, private DLNs can be used to mitigate the lack of privacy that may be present in public DLNs. Private DLNs, however, can be cumbersome and expensive to maintain. Further, the privacy concerns may not be fully addressed by private DLNs as a participant of a private DLN may still be privy to the confidential information of other participants of that private DLN.

In some embodiments, zero-knowledge proofs (ZKPs) can be used to enhance the level of privacy that is available on DLNs while retaining the level of trust afforded by the decentralized nature of the networks. For example, the implementation of ZKPs in a DLN to form a ZKP-enabled DLN allows for details of a transaction (e.g., identities of the transacting parties, identities of the assets, etc.) to remain secret (or private or controlled by the parties) when using the ZKP-enabled DLN to manage the transaction. Referring to the example provided above, the implementation of ZKPs in a DLN used by a pharmacy to facilitate the shipment of the drugs to patients may facilitate the concealment of a patient's sensitive information from other participants of the ZKP-enabled DLN or the public at large, examples of which include any identifying information related to the assets being transacted (i.e., the drugs) and the transacting parties (i.e., the pharmacy and the clients), while still allowing the parties to depend on the trust that is a major feature of DLNs.

In some embodiments, a ZKP-enabled DLN can be used to facilitate a transaction involving a non-fungible physical asset (e.g., drugs) with the use of token commitments that encode therein information related to the asset (e.g., the drugs), the sender of the asset (e.g., the pharmacy) and/or the recipient of the asset (e.g., the patient). In some implementations, an asset token may be generated to identify the asset, for example, by hashing some identifying parameters of the asset. In some cases, the generation of the asset token may be achieved off of the ZKP-enabled DLN (e.g., the hashing may not be computed on the ZKP-enabled DLN, but rather outside the network). Further, a token commitment that may be used to represent the asset on the ZKP-enabled DLN may be generated based on the asset token and may also include a public identifier (e.g., a public key on the ZKP-enabled DLN) of the owner of the asset to encode ownership information of the asset. For example, a token commitment for the drugs may be generated based on an asset token that identifies the drugs (e.g., drug names, brand of the drug, dosages, quantity, etc.) and/or a public key on the ZKP-enabled DLN of the pharmacy.

In some embodiments, to represent the transfer of the asset to a recipient, a new token commitment (recipient token commitment) may be generated, the new token commitment including an asset token identifying the same asset (e.g., the same asset token used in generating the token commitment that included the public key of the sender) and the public key on the ZKP-enabled DLN of the recipient of the asset (e.g., patient). In some implementations, the generation of the new token commitment may be accompanied by the invalidation or nullification of the token commitment that included the public key of the transferor of the asset (e.g., pharmacy), indicating the transfer of ownership of the physical asset from the transferor to the recipient. The representation, on the ZKP-enabled DLN, of the transfer of the asset from the transferor to the recipient would not become effective, however, until ZKPs, generated by the transferor and claiming, among other things, that both the token commitments include asset tokens identifying the same asset (e.g., include the same asset token identifying the asset), are verified by a smart contract of the ZKP-enabled DLN. In such implementations, the use of the ZKPs allows the transferor to convince the recipient (and other participants of the ZKP-enabled DLN) about the truthfulness of the claim without having to disclose the asset token itself (and hence, the asset being transferred). That is, the transferor can generate, using a computing node (e.g., on or off-the ZKP-enabled DLN), a ZKP that can be verified by a smart contract on the ZKP-enabled DLN, and the recipient may check, using its own computing node, the results of the verification computation to determine whether a claim contained within the ZKP has been verified as true. As such, the recipient can be convinced about the veracity of the information underlying the claim (e.g., the claim being the claim that the token commitment includes the asset token) without necessarily having access to the underlying information (e.g., without necessarily having access to the asset token). As such, a ZKP-enabled DLN facilitates or improves privacy for the participants of the network while still preserving the trust derived at least in part due to the transparency of DLNs. Details of the implementation of ZKPs in DLNs for use in facilitating the representation of the transfer of assets on ZKP-enabled DLNs can be found in applicant's U.S. Provisional Application No. 62/719,636, filed Aug. 18, 2018, entitled "Methods and Systems of ZKP-Based Secure PE Transactions on Public Networks," and U.S. Nonprovisional application Ser. No. 16/283,452, filed Feb. 22, 2019, entitled "Methods and Systems for Enhancing Privacy and Efficiency on Distributed Ledger-Based Networks, which are incorporated herein by reference in their entireties.

In some embodiments, the use of ZKPs in DLNs to preserve or enhance the privacy or confidentiality of transactions, however, may frustrate or inhibit the proper auditing of the transactions. For example, if a company engages in transactions involving digital assets (e.g., with the use of crypto-currencies) and/or off-chain physical assets (e.g., with the use of tokens), and uses a ZKP-enabled DLN to represent and manage the transactions, the details of the transactions may be concealed from an auditor (and other participants of the ZKP-enabled DLN other than the transacting parties) as discussed above, making the independent auditing of the transactions largely impossible (e.g., without the active involvement of the transacting parties). For example, the auditor would have almost no way of verifying any assertions made by the transaction parties related to the assets transferred, the cryptocurrencies paid, the time/date of the transactions, the identities of the transaction participants, and/or etc. As such, a need exists for methods and systems that allow auditors to obtain access to information related to transactions that are undertaken with the aid of ZKPs in ZKP-enabled DLNs. In some embodiments, ZKPs can be used by participants of a ZKP-enabled DLN to prove ownership of an account on the ZKP-enabled DLN, as discussed in applicant's U.S. Nonprovisional application Ser. No. 16/383,845, filed Apr. 15, 2019, entitled "Methods and Systems for Identifying Anonymized Participants of Distributed Ledger-Based Networks Using Zero-Knowledge Proofs", which is incorporated herein by reference in its entirety.

Throughout the instant disclosure, the term "audit" refers to but is not limited to a review of actions taken on a ZKP-enabled DLN, a review of participants of the ZKP-enabled DLN, a review of accounts on the ZKP-enabled DLN, and/or the like. For example, the actions may include transactions undertaken or represented on the ZKP-enabled DLN, such as but not limited to transactions between participants of the ZKP-enabled DLN. For instance, an "audit" of the transactions may include a review of the transaction data (e.g., for accuracy, completeness, and/or etc.). An audit or review of the participants may include, for example, a review of the participants' access to, ownership of, association with, and/or etc., with an account on the ZKP-enabled DLN. For instance, an "audit" of a participant on the ZKP-enabled DLN may include a review of the participant's credentials that (e.g., a ZKP stating that) the participant has access to, ownership of, association with, and/or etc., an account on the ZKP-enabled DLN. An audit or review of accounts on the ZKP-enabled DLN may include, for example, review of most or all information related to the accounts, including but not limited to contents of the accounts, current and/or previous ownerships of the accounts, records related to the accounts, and/or the like. The term "auditor" may refer to the entity (e.g., person(s), companies, and/or etc.) performing the audit process as discussed above. In some implementations, an auditor may include entities that perform traditional auditing processes. In some implementations, an auditor may include entities that do not perform traditional auditing processes but may be provided access to review actions and/or accounts on the ZKP-enabled DLN, non-limiting examples of which include regulators, observers, etc. In some embodiments, the auditor may also be a participant of the ZKP-enabled DLN. The term "auditee" may refer to the entity (e.g., person(s), companies, and/or etc.) on the ZKP-enabled DLN that are involved in the transactions that are being audited, whose access to, ownership of, association with, and/or etc., to an account is being audited, and/or etc. In some cases, the auditee may also be a participant of the ZKP-enabled DLN.

FIG. 1 shows a schematic illustration of the access and retrieval of data concealed using ZKP techniques on a ZKP-enabled DLN, the data generated as a result of a private transaction between two parties that are participants of the network, in particular a public network, according to some embodiments. In some embodiments, the ZKP-enabled DLN or blockchain network 100 includes a plurality of computing nodes 102a-102e configured to communicate amongst each other via a peer-to-peer (P2P) connection. In some implementations, the computing nodes 102a-102e can be computing devices including but not limited to computers, servers, processors, data/information processing machines or systems, and/or the like, and may include data storage systems such as databases, memories (volatile and/or non-volatile), etc. operatively coupled to the processors. In some implementations, the P2P connections may be provided by wired and/or wireless communications systems or networks such as but not limited to the internet, intranet, local area networks (LANs), wide area networks (WANs), etc., utilizing wireless communication protocols or standards such as WiFi®, LTE®, WiMAX®, and/or the like.

In some embodiments, the ZKP-enabled DLN 100 may include self-executing codes or smart contracts that are configured to execute upon fulfillment of conditions that are agreed upon between transacting parties. For example, some or all of the computing nodes 102a-102e may include copies of a self-executing code that self-execute upon fulfillment of the conditions. In some implementations, the computing nodes 102a-102e may communicate amongst each other with the results of the executions of their respective self-executing codes, for example, to arrive at a consensus on the results. In some implementations, one or a few of the computing nodes 102a-102e may have self-executing codes that self-execute, and the results would be transmitted to the rest of the computing nodes 102a-102e for confirmation.

In some embodiments, a self-executing code or a smart contract can facilitate the completion of transactions on the ZKP-enabled DLN 100 by providing the transacting parties confidence that the other party would deliver the promised product or payment. For example, with reference to the above example related to the sale of a digital music file, a smart contract can be used to verify that the seller of the file is in fact an owner of the file, the buyer of the music file has adequate resource to pay for the music, etc. Further, the smart contract can facilitate the exchange of the music file by allowing the transfer of a payment to occur only after the transfer of the music file is completed (and validated). In some embodiments, the smart contract may be configured to compute a ZKP submitted by participants to verify the ZKP, i.e., verify the assertions contained within the ZKP. For example, once multiple participants (e.g., 110a, 110b) of the ZKP-enabled DLN 100 participate in a transaction, one or more of the transacting parties may encrypt data related to the transaction for audit by an auditor (e.g., 110c), and generate and submit to the smart contract a ZKP that asserts, among other things, that the encrypted data includes data related to the transaction. In such embodiments, the smart contract may verify the ZKP (e.g., verify the assertion that, among other things, the encrypted data includes data related to the transaction), which allows the auditor to complete the audit process with knowledge that the data being audited is in fact data related to the transaction.

In some embodiments, the ZKP-enabled DLN 100 may be linked to one or more oracles (not shown) or data feeds that provide external data to the ZKP-enabled DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on the price of a stock, a weather condition, etc., and an oracle may provide the requisite information to the smart contract facilitating the transaction. The smart contract, upon receiving the information, may self-execute after determining that the condition for the transaction has been fulfilled. In some embodiments, the oracles may facilitate for the smart contracts to send data out to external systems. For example, a smart contract on a ZKP-enabled DLN 100 may be configured to verify the ZKP provided by the transaction participants on at a certain date and time, and send out the results of the verification to the auditor's device or system when the verification is complete. In some implementations, an oracle may serve as a transit hub for the data including the verification results during its transmission to the auditor's device or system.

In some embodiments, at least a substantial number of the computing nodes 102a-102e include copies of a distributed ledger 104a-104e onto which transactions that occur on the network are recorded (e.g., including details of transactions that are not cloaked with ZKPs). The recording of the transactions on the distributed ledger 104a-104e may occur when some substantial proportion of the computing nodes 102a-102e, or a subset thereof, agree on the validity of the transactions. The distributed ledger 104a-104e can be immutable or nearly immutable in the sense that to alter the distributed ledger 104a-104e, at least this substantial portion of the computing nodes 102a-102e would have to agree, which can be increasingly difficult when the number of computing nodes 102a-102e is large (and the distributed ledger 104a-104e gets longer).

As noted above, the ZKP-enabled DLN 100 can be used to facilitate transactions that involve digital assets (e.g., sale of digital music files, transfer of crypto-currencies, etc.). In some embodiments, the ZKP-enabled DLN 100 can also be used to facilitate transactions of assets that occur off-chain or off-line (e.g., transactions of physical assets such as, but not limited to, the movement (e.g., transfer) of physical assets, the change of title of physical assets, the combination or splitting of physical assets (e.g., before being transferred to a new owner, etc.). In some implementations, off-chain assets can be represented by tokens on the ZKP-enabled DLN 100, and the sale or transfer of the off-chain assets can be represented on the ZKP-enabled DLN 100 by the transfer of the tokens between the blockchain accounts of the transacting parties. For example, as discussed above, this "transfer of the tokens" can be implemented on the ZKP-enabled DLN 100 by the nullification or invalidation of a token commitment belonging to the transferor of the off-chain asset accompanied by the creation of a new token commitment assigning ownership of the off-chain asset to the recipient of the asset. In some implementations, the types of tokens used to represent the off-chain assets can depend on the nature of the assets themselves. For example, fungible products (e.g., some amount of gasoline or a currency) can be represented with fungible tokens while non-fungible products (e.g., distinguishable products such as a product with a serial number) can be represented by non-fungible tokens.

FIG. 1 shows an example embodiment of a transaction that involves the sale of an off-chain asset 112 (e.g., a package of books) from a first transaction participant 110a to a second transaction participant 110b. In such example, the package may be represented on the ZKP-enabled DLN 100 with a non-fungible token that can be transferred from the first transaction participant 110a to the second transaction participant 110b to represent the sale or transfer of the off-chain physical asset 112 during the transaction between the two parties. In some embodiments, tokens may be stored off-chain, i.e., off of the ZKP-enabled DLN 100. For example, tokens may be stored in storage systems or databases that are linked with the ZKP-enabled DLN 100. For instance, if the ZKP-enabled DLN 100 is a ZKP-enabled Ethereum blockchain network, the tokens may be stored in the Swarm database. In some embodiments, the tokens may be stored on the ZKP-enabled DLN 100 (e.g., in the storage systems associated with the computing nodes 102a-102e). In some embodiments, as a payment 114 for the sale or transfer of the off-chain asset 112, the second transaction participant 110b may transfer a fungible token (e.g., crypto-currency) to the first transaction participant 110a.

In some embodiments, as noted above, transactions that occur on the ZKP-enabled DLN 100 (including off-chain transactions that are represented on the ZKP-enabled DLN 100 with the use of tokens, for example) are recorded onto at least a substantial number (e.g., a majority, at least 60%, at least 75%, etc.) of the distributed ledgers 104a-104e that exist on the ZKP-enabled DLN 100. For example, the transaction between a first transaction participant 110a and a second transaction participant 110b on the ZKP-enabled DLN 100 representing the transfer of an off-chain asset 112 from the former to the latter would be recorded on all or nearly all of the distributed ledgers 104a-104e once the transaction details are accepted as valid by the participants of the ZKP-enabled DLN 100. Similarly, the payment 114 of a fungible token (e.g., crypto-currency) as a payment for the off-chain asset 112 would be recorded on all or nearly all of the distributed ledgers 104a-104e once the payment is accepted as valid. In the case of a blockchain network that is not ZKP-enabled, the first transaction participant 110a and the second transaction participant 110b may be afforded little or no privacy as all or nearly all the details of the transaction are made public or visible to all that have access to the blockchain network (the public, in case of public blockchain networks), such details including confidential information on the transacting participants, the asset being transacted, the fungible as well as non-fungible tokens and their transfers on the blockchain network, and/or the like. In other words, without the use of ZKPs to cloak details of the transaction, all or nearly all information that the transaction participants may wish to keep secret may be revealed to the public or at least to all other participants of the blockchain network.

In some embodiments, as discussed above and in more details in applicant's U.S. Provisional Application No. 62/719,636, filed Aug. 18, 2018, entitled "Methods and Systems of ZKP-Based Secure PE Transactions on Public Networks," and U.S. Nonprovisional application Ser. No. 16/283,452, filed Feb. 22, 2019, entitled "Methods and Systems for Enhancing Privacy and Efficiency on Distributed Ledger-Based Networks", which are incorporated herein by reference in their entireties, ZKPs can be used to cloak a transaction from the public or participants of the ZKP-enabled DLN 100 that are not party to the transaction. For example, ZKPs can be used to conceal transaction data such as information related to non-fungible tokens and/or fungible tokens exchanged between the transacting parties, information related to the identities of the transacting parties, information identifying the assets transferred between the transacting parties, etc. For instance, the transaction data that can be concealed or cloaked with the aid of ZKP techniques may include the public key on the ZKP-enabled DLN 100 of the asset transferor 110a, the public key on the ZKP-enabled DLN 100 of the asset recipient 110b, identifying information of asset tokens used to identify non-fungible off-chain assets, identifying information of token commitments used to represent the non-fungible off-chain assets on the ZKP-enabled DLN 100, a balance or amount of the fungible tokens (e.g., cryptocurrency) transferred as payment to the off-chain assets, and/or the like. In some implementations, the concealed transaction data, however, may need to be made available to an auditor 110c, without necessarily exposing or revealing the data to the public or other participants of the ZKP-enabled DLN 100. In such implementations, one or more of the transacting parties (e.g., 110a, 110b) may encrypt the transaction data, and provide a decryption key to the auditor 110c to obtain access and retrieve the encrypted transaction data. Further, one or more of the transacting parties (e.g., 110a, 110b) may generate and provide to a smart contract on the ZKP-enabled DLN 100 a ZKP that asserts, among other things, the encrypted data includes the transaction data, as discussed in detail below with reference to FIG. 2.

In some embodiments, ZKPs can be used by a first entity, the "prover" or "provider" of the proofs, to convince a second entity, the "verifier" of the proofs, that a statement about some secret information is truthful without having to reveal the secret information to the prover. ZKPs can be interactive, i.e., require interaction from the prover for the verifier to verify the truthfulness of the statement. In some embodiments, the ZKPs can be non-interactive, requiring no further interaction from the prover for the verifier to verify the statement. Examples of non-interactive ZKPs include zero-knowledge succinct non-interactive argument of knowledge (zk-SNARK), zero-knowledge scalable transparent argument of knowledge (zk-STARK), etc. Discussions of at least some aspects of ZKPs, zk-SNARK, etc., can be found in applicant's U.S. Nonprovisional application Ser. No. 16/383,845, filed Apr. 15, 2019, entitled "Methods and Systems for Identifying Anonymized Participants of Distributed Ledger-Based Networks using Zero-Knowledge Proofs, which is incorporated by reference herein in its entirety.

Figure 2:
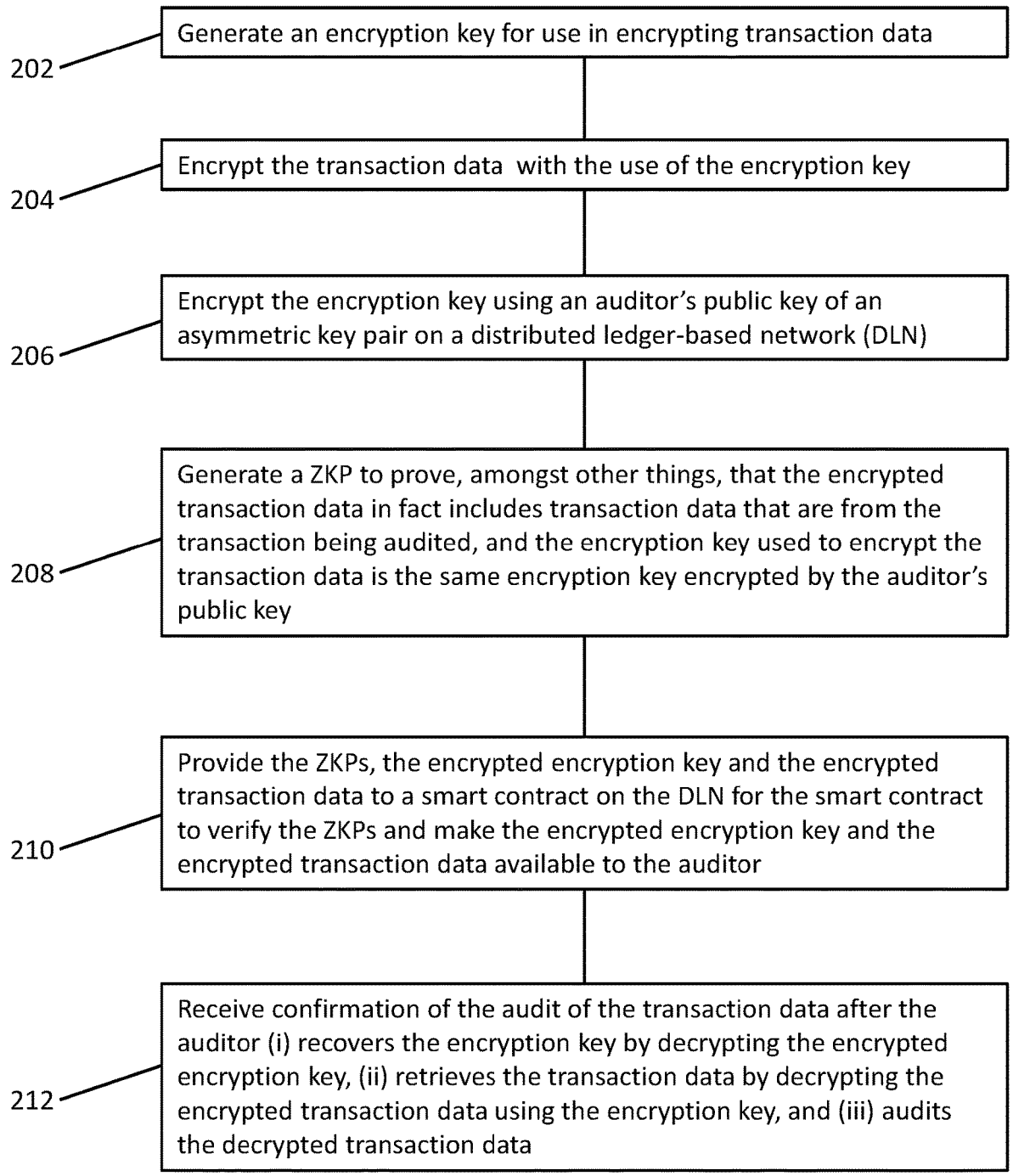
FIG. 2 shows a flow chart illustrating the encryption of data by a first party to make the data available on a distributed ledger-based network (DLN) for later use by a second party while keeping the data secure from access by other participants of the DLN, according to some embodiments.

FIG. 2 shows a flow chart illustrating the encryption of data by a first party to make the data available on a ZKP-enabled DLN 100 for later use by a second party while keeping the data secure from access by other participants of the ZKP-enabled DLN 100, according to some embodiments. In some embodiments, as noted above, ZKP-enabled DLN 100 participants 110a and 110b may engage in a transaction using ZKP techniques, thereby hiding details of the transaction from other participants of the ZKP-enabled DLN 100. The transacting parties 110a, 110b, however, may wish to make data related to the transaction available to a third participant of the ZKP-enabled DLN 100 that is assigned to audit the transaction (e.g., auditor 110c) while still preserving the secrecy of the transaction when it comes to the other participants of the ZKP-enabled DLN 100 (or the public at large). In other words, the transacting parties 110a, 110b may wish to make the transaction data available to auditor 110c without revealing the transaction data, and/or any information that may reveal the transaction data, to the other participants of the ZKP-enabled DLN 100 (or the public at large). In some embodiments, the transacting parties 110a, 110b may choose to first encrypt the transaction data. Accordingly, in some implementations, at 202, the transacting party 110a and/or the transacting party 110b (referred hereinafter collectively as "auditee") may obtain (e.g., generate, retrieve, receive, etc.), using the computing node 102a and/or the computing node 102b (referred hereinafter collectively as "auditee computing node"), an encryption key for use in encrypting the transaction data. In some implementations, when the auditee 110a, 110b uses the auditee computing node 102a, 102b, it is to be understood that if the auditee 110a, 110b is the first transaction participant 110a, then the auditee 110a is using the computing node 102a (i.e., the auditee computing node 102a, 102b is the computing node 102a) and if the auditee 110a, 110b is the second transaction participant 110b, then the auditee 110b is using the computing node 102b (i.e., the auditee computing node 102a, 102b is the computing node 102b). The encryption key can be a symmetric encryption key (SEK) or an asymmetric encryption key pair.

In some implementations, the transaction data may include data related to the transacting parties, data related to the assets being transacted or transferred between the transacting parties, metadata related to the transaction such as but not limited to time, date, etc., of the transaction, and/or the like. In some implementations, the transaction data related to the assets may depend on the type of the asset. For example, with reference to FIG. 1, for the off-chain non-fungible physical asset 112, the transaction data related to the assets may include the identifier of the asset (e.g., a non-fungible token). For instance, the identifier of the non-fungible physical asset 112 may be an asset token obtained by applying a hashing function or hashing algorithm on an identifying parameter of the physical asset 112. In some implementations, the transaction data related to the assets may also include token commitments used to represent the physical asset 112 and/or the owner of the physical asset 112 on the ZKP-enabled DLN 100 (e.g., the owner as identified by a public key). For instance, the token commitments may be generated by hashing, among other things, the asset token identifying the physical asset 112 and/or the public key on the ZKP-enabled DLN 100 of the owner of the asset, as discussed in more details in applicant's U.S. Provisional Application No. 62/719,636, filed Aug. 18, 2018, entitled "Methods and Systems of ZKP-Based Secure PE Transactions on Public Networks," incorporated herein by reference in their entireties. In some implementations, the transaction data related to the payment 114 may include the amounts or balances, or changes thereof, of the cryptocurrencies or fungible in the accounts of the transacting parties 110a, 110b.

In some implementations, the transaction data related to the transacting parties may include the public key(s) on the ZKP-enabled DLN 100 of the transacting parties (e.g., auditee 110a, 110b). In some instances, the public key(s) of the auditee 110a, 110b may be the public key(s) used by the auditee 110a, 110b, to engage in the transaction. For example, the public key(s) of the auditee 110a, 110b may be the public key(s) used in generating the above-noted token commitments that represented the physical asset 112 on the ZKP-enabled DLN 100. As another example, the public key(s) of the auditee 110a, 110b may be the public key(s) used by the auditee 110a, 110b to send/receive payment 114 (e.g., cryptocurrencies, fungible tokens, etc.) as part of the transaction.

In some embodiments, after generating the encryption key at 202, the auditee 110a, 110b, at 204 and using the auditee computing node 102a, 102b, may encrypt the transaction data using the generated encryption key. In some implementations, the encryption key can be a symmetric encryption key (SEK), and the transaction data may be encrypted with the use of the SEK. In some implementations, the encryption key may be from an asymmetric encryption key pair (e.g., it may be the public key from the asymmetric encryption key pair), and the transaction data may be encrypted with the use of the public key of the asymmetric encryption key pair. In some implementations, the encryption of the transaction data using the SEK and/or the asymmetric encryption key pair at least substantially prevents all participants of the ZKP-enabled DLN 100 (except for the transacting parties) from accessing the transaction data without possession of the SEK and/or the private key of the asymmetric encryption key pair, respectively (the transacting parties may have access to the transaction data without possessing the SEK and/or the private key by virtue of being parties to the transaction).

In some embodiments, at 206, the auditee 110a, 110b may encrypt, using the auditee computing node 102a, 102b, the encryption key used to encrypt the transaction data. For example, the auditee 110a, 110b may encrypt the encryption key (e.g., the SEK, the public key from the asymmetric key pair) using the public key of the participant of the ZKP-enabled DLN 100 that is assigned to audit the transaction (e.g., auditor 110c). In other words, the encryption key used to encrypt the transaction data may itself be encrypted using the public key of the auditor 110c. In some implementations, the encryption of the encryption key (e.g., the SEK, the public key from the asymmetric key pair) using the public key of the auditor 110c at least substantially prevents all participants of the ZKP-enabled DLN 100 (except the auditee 110a, 110b and the auditor 110c) from having access to the encryption key, as one would need to use the private key of the auditor 110c, which is secret and at least nominally available only to the auditor 110c or its assigned agents, to decrypt the encrypted encryption key (the auditee 110a, 110b may have access to the encryption key without the private key of the auditor 110c by virtue of having generated the encryption key). In some embodiments, the encrypted data, the encrypted encryption key and/or the asset token representing the physical asset (e.g., non-fungible asset) may be stored (e.g., in the storage systems of the ZKP-enabled DLN 100, such as but not limited to the storage systems associated with the computing nodes 102a-102e) so as to be retrievable together.

In some implementations, the auditee 110a, 110b may use a symmetric encryption key to encrypt the encryption key (e.g., the SEK, the public key from the asymmetric key pair) that was used to encrypt the transaction data. In such cases, since this encryption can only be decrypted with the same symmetric encryption key, the auditee 110a, 110b may avail the symmetric encryption key to the auditor 110c in private (e.g., without availing the key to other participants of the ZKP-enabled DLN 100 or the public at large).

In some embodiments, after encrypting the transaction data with an encryption key and encrypting the encryption key with the public key of the auditor 110c, the auditee 110a, 110b may wish to avail the encrypted transaction data and the encrypted encryption key to the auditor 110c so that the auditor 110c can audit the transaction data. Before availing the encrypted transaction data and the encrypted encryption key to the auditor 110c, however, in some implementations, the auditee 110a, 110b would have to demonstrate or prove to the auditor 110c the following: (i) the encryption key used to encrypt the transaction data is the same encryption key as the encryption key encrypted with the use of the auditor's 110c public key; (ii) the encrypted transaction data in fact include transaction data (in an encrypted form); that is, for example, the encrypted transaction data include data related to the transacting parties, data related to the assets being transacted or transferred between the transacting parties, metadata related to the transaction such as but not limited to time, date, and/or etc., of the transaction (all in an encrypted form), as discussed above; and/or (iii) the encrypted transaction data in fact includes transaction data from the transaction between the auditees 110a, 110b that is being audited.

To demonstrate one or more of (i), (ii) and (iii) above, in some embodiments, the auditee 110a, 110b may generate, at 208 and using the auditee computing node 102a, 102b, a ZKP that can be used to prove one or more of (i), (ii) and (iii). For example, the auditee 110a, 110b may generate, using the auditee computing node 102a, 102b, a ZKP that an SEK used to encrypt the transaction data is the same SEK as the SEK encrypted using the auditor's 110c public key. Further, the ZKP may also include a proof that the encrypted transaction data include transaction data such as information related to: asset identifiers (e.g., asset tokens), token commitments that represent the transacted assets on the ZKP-enabled DLN 100, balances or amounts of cryptocurrencies or fungible tokens that are exchanged as part of the transaction, and/or the like. In addition, the ZKP may include a proof that the encrypted transaction data include transaction data from the transaction that is being audited. For example, the ZKP may include a proof that a time-stamp in the transaction data identifying the time, date, etc., of the transaction is in fact the time, date, etc., of the transaction that is being audited. As another example, the ZKP may include a proof that a transaction identification number in the transaction data in fact identifies the transaction that the auditor 110c is assigned to audit.

In some embodiments, at 210 and using the auditee computing node 102a, 102b, the auditee 110a, 110b may provide the ZKP, the encrypted encryption key, the encrypted data and/or any additional input that may be needed for verifying the ZKP to the auditor 110c and/or the smart contract of the ZKP-enabled DLN 100. In some implementations, the auditee 110a, 110b may provide or publish the ZKP, the encrypted encryption key, the encrypted data and/or the additional input to the smart contract anonymously. After the ZKP, the encrypted encryption key, the encrypted data and/or the additional input are provided to the auditor 110c and/or the smart contract, in some embodiments, the auditor 110c may proceed with having the smart contract verify the ZKP to determine the validity of statements (i), (ii) and/or (iii), above. For example, the auditor 110c may cause the smart contract to start the computation of the ZKP to determine the validity of the ZKP. In some implementations, the smart contract may be programmed to initiate (e.g., automatically) the computation of the ZKP based on a pre-determined condition. For example, the smart contract may compute the ZKP at pre-determined dates and times (e.g., the date and time information may be obtained by the smart contract from an oracle, as discussed above).

In some embodiments, the smart contract may compute the ZKP to verify the validity of the ZKP. For example, the smart contract may use the additional input, if needed, to verify the ZKP. In some implementations, if the smart contract fails to verify the ZKP, the encrypted transaction data and/or the encrypted encryption key may be considered inauthentic (and, in some instances, may be discarded). In some implementations, the smart contract may verify the ZKP as valid and proceed to store (e.g., in the storage systems of the ZKP-enabled DLN 100, such as but not limited to the storage systems associated with the computing nodes 102a-102e) and/or make available to the auditor 110c the encrypted transaction data and/or the encrypted encryption key.

After the smart contract verifies the ZKP and makes the encrypted transaction data and/or the encrypted encryption key available to the auditor 110c, in some embodiments, the auditor 110c may proceed, at 212, with recovering the encryption key. For example, since the encryption key was encrypted by the auditee 110a, 110b using the public key on the ZKP-enabled DLN 100 of the auditor 110c, the auditor 110c may recover the encryption key by decrypting, using the computing node 102c, the encrypted encryption key with the use of the private key of the auditor 110c. As noted above, in some implementations, the encryption key can be a SEK (e.g., when the transaction data was encrypted using the SEK) or the public key from the asymmetric encryption key pair (e.g., when the transaction data was encrypted using the public key of the asymmetric encryption key pair).

In some embodiments, upon recovering the encryption key, the auditor 110c may then decrypt the encrypted transaction data using the recovered encryption key to retrieve the transaction data. For example, in some implementations, if the recovered encryption key included the SEK, then the transaction data was encrypted with the SEK, and the auditor 110c may decrypt the encrypted transaction data using the recovered SEK to retrieve the transaction data. As another example, in some implementations, if the recovered encryption key was from the asymmetric encryption key pair, then the transaction data was encrypted with the public key of the asymmetric encryption key pair, and the auditor 110c may decrypt the encrypted transaction data using the private key of the asymmetric encryption key pair to retrieve the transaction data. After retrieving or obtaining the transaction data, in some implementations, the auditor 110c may audit the transaction data. In some instances, the auditor 110c may send a confirmation to whoever requested the audit (e.g., the auditee 110a, 110b or both transaction participants 110a and 110b) that the transaction has been audited once the audit process of the transaction data is completed.

It is to be noted that at least some of the above disclosed embodiments facilitate access to and retrieval of data (e.g., transaction data) concealed on ZKP-enabled DLN 100 with the use of ZKPs without the transaction data being necessarily revealed to participants of the ZKP-enabled DLN 100 (or the public at large) that were not either parties to the transaction (e.g., the transacting parties 110a and 110b) or the auditor 110c. As such, in such embodiments, the use of ZKPs to provide the auditor 110c access to the transaction data allows for an audit of the transaction to occur without violating the privacy of the transacting participants (and the confidentiality of the transaction data with respect to non-parties of the transaction or the audit process). Further, the use of ZKPs can improve the efficiency of the transaction audit process as it can be used to reduce costly interactions between the auditee 110a, 110b and the auditor 110c to have transactions audited. For example, in some embodiments, once an auditor-auditee relationship is established between some or all of the participants of the ZKP-enabled DLN 100 and the auditor 110c, participants of the ZKP-enabled DLN 100 that are involved in a transaction may avail the transaction data to the auditor 110c without prompt from or interaction with the auditor 110c. For example these participants may provide encrypted transaction data, encrypted encryption key, ZKPs and/or input that may be needed to prove the ZKPs, if any (e.g., as discussed above) to a smart contract of the ZKP-enabled DLN 100, which may then store on the storage systems of the ZKP-enabled DLN 100 for later use by the auditor 110c after verifying the ZKPs. As such, the encrypted transaction data and/or the encrypted encryption key may be stored on the storage systems of the ZKP-enabled DLN 100 (and hence be made available to the auditor 110c) without a need for communication or interaction between the participants whose transactions are being audited and the auditor 110c. Further, the auditor 110c can retrieve and audit the transaction data (e.g., as discussed above) whenever it is suitable for the auditor 110c to do so (which improves the efficiency of the auditor's 110c operations).

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method performed by at least one processor, the method comprising:

encrypting, using an encryption key, data related to a transaction between a first party and a second party to generate an encrypted data, the transaction represented on a zero-knowledge proof (ZKP)-enabled distributed ledger-based network (DLN);

encrypting the encryption key using a public key retrieved from the ZKP-enabled DLN to generate an encrypted encryption key, the public key associated with an auditor assigned to audit the transaction; and providing to a self-executing code segment on the ZKP-enabled DLN a ZKP that the encryption key used to encrypt the data corresponds to the encryption key encrypted using the public key such that the encrypted encryption key and the encrypted data are available to the auditor after the ZKP is verified by the self-executing code segment, the transaction including a transfer of a token representing a fungible asset from the first party to the second party or a generation of an asset token representing a non-fungible asset to be transferred from the first party to the second party, the ZKP including the ZKP that the encrypted data include (1) a public key of the first party, (2) a public key of the second party, and (3) an amount of the token representing the fungible asset or an identifier of the asset token representing the non-fungible asset, at least one of the encrypted encryption key or the encrypted data being available to the auditor without a private key of the first party on the ZKP-enabled DLN and a private key of the second party on the ZKP-enabled DLN being provided to the auditor, such that the auditor audits the transaction using the at least one of the encrypted encryption key or the encrypted data.

2. The method of claim 1, wherein the encryption key is a symmetric encryption key.

3. The method of claim 1, wherein the transaction includes the generation of the asset token representing the non-fungible asset to be transferred from the first party to the second party,
the data including the public key of the first party, the public key of the second party and/or the identifier of the asset token.

4. The method of claim 1, wherein the transaction includes the transfer of the token representing the fungible asset from the first party to the second party,
the data including the public key of the first party, the public key of the second party and/or the amount of the token being transferred.

5. The method of claim 1, wherein the ZKP includes the ZKP that the encrypted data include the data related to the transaction between the first party and the second party.

6. A method performed by at least one processor, the method comprising:
receiving, at a compute node of an auditor, a request to have a transaction audited, the transaction being represented on a zero-knowledge proof (ZKP)-enabled distributed ledger-based network (DLN) and being between a first party and a second party;
retrieving, in response to the request and from the ZKP-enabled DLN, encrypted data and an encrypted encryption key,
the encrypted data including data related to the transaction and encrypted using an encryption key,
the encrypted encryption key being formed by an encryption of the encryption key using a public key retrieved from the ZKP-enabled DLN, the public key associated with the auditor and being part of an asymmetric key pair on the ZKP-enabled DLN;
decrypting, using a private key of the asymmetric key pair, the encrypted encryption key to obtain the encryption key; and
decrypting the encrypted data using the encryption key to obtain the data related to the transaction for use in auditing the transaction,
the transaction including a transfer of a token representing a fungible asset from the first party to the second party or a generation of an asset token representing a non-fungible asset to be transferred from the first party to the second party,
a self-executing code segment on the ZKP-enabled DLN verifying a ZKP that the encrypted data include (1) a public key of the first party, (2) a public key of the second party, and (3) an amount of the token representing the fungible asset or an identifier of the asset token representing the non-fungible asset,
the transaction being audited by the auditor using at least one of the encrypted encryption key or the encrypted data, without a private key of the first party on the ZKP-enabled DLN and a private key of the second party on the ZKP-enabled DLN being provided to the auditor.

7. The method of claim 6, wherein a self-executing code segment on the ZKP-enabled DLN verifies the ZKP that the encryption key used to encrypt the data corresponds to the encryption key encrypted using the public key.

8. The method of claim 6, wherein a self-executing code segment on the ZKP-enabled DLN verifies the ZKP that the encrypted data include the data related to the transaction between the first party and the second party.

9. The method of claim 6, wherein the transaction is audited without the first party and/or the second party responding to a cryptographic challenge from the auditor.

10. The method of claim 6, wherein the transaction is audited without the first party and/or the second party being party to a test transaction from the auditor.

11. The method of claim 6, wherein the encryption key is a symmetric encryption key.

12. A method performed by at least one processor, the method comprising:
receiving, at a self-executing code segment on a zero-knowledge proof (ZKP)-enabled distributed ledger-based network (DLN), an encrypted data and an encrypted encryption key,
the encrypted data encrypted with a use of an encryption key and including data related to a transaction represented on the ZKP-enabled DLN and between a first party and a second party,
the encrypted encryption key encrypted with a use of a public key retrieved from the ZKP-enabled DLN and associated with an auditor assigned to audit the transaction, the transaction including a transfer of a token representing a fungible asset from the first party to the second party or a generation of an asset token representing a non-fungible asset to be transferred from the first party to the second party;
receiving, at the self-executing code segment, a zero-knowledge proof (ZKP) that the encryption key used to encrypt the data corresponds to the encryption key encrypted using the public key;
verifying the received ZKP, the ZKP includes the ZKP that the encrypted data include (1) a public key associated with the first party on the ZKP-enabled DLN, (2) a public key associated with the second party on the ZKP-enabled DLN, and (3) an amount of the token representing the fungible asset or an identifier of the asset token representing the non-fungible asset; and
storing, after the received ZKP is verified, the encrypted data and the encrypted encryption key such that the stored encrypted data and encrypted encryption key are retrievable without a private key of the first party on the ZKP-enabled DLN and a private key of the second party on the ZKP-enabled DLN being provided to the auditor, such that the auditor audits the transaction using at least one of the stored encrypted data or the encrypted encryption key.

13. The method of claim 12, wherein:
the transaction includes the generation of the asset token representing the non-fungible asset to be transferred from the first party to the second party,
storing the encrypted data and the encrypted encryption key includes storing the encrypted data, the encrypted encryption key and the asset token such that the encrypted data, the encrypted encryption key and the asset token are retrievable together.

14. The method of claim 12, wherein:
the transaction includes the generation of the asset token representing the non-fungible asset to be transferred from the first party to the second party,
the data including the public key associated with the first party on the ZKP-enabled DLN, the public key associated with the second party on the ZKP-enabled DLN and/or identifier of the asset token.

15. The method of claim 12, wherein the encryption key is a symmetric encryption key.

16. A processor-readable non-transitory medium storing processor-issuable instructions configured to:
   encrypt, using an encryption key, data related to a transaction between a first party and a second party to generate an encrypted data, the data transaction represented on a zero-knowledge proof (ZKP)-enabled distributed ledger-based network (DLN);
   encrypt the encryption key using a public key retrieved from the ZKP-enabled DLN to generate an encrypted encryption key, the public key associated with an auditor assigned to audit the transaction; and
   provide to a self-executing code segment on the ZKP-enabled DLN a ZKP that the encryption key used to encrypt the data corresponds to the encryption key encrypted using the public key such that the encrypted encryption key and the encrypted data are available to the auditor after the ZKP is verified by the self-executing code segment,
   the transaction including a transfer of a token representing a fungible asset from the first party to the second party or a generation of an asset token representing a non-fungible asset to be transferred from the first party to the second party,
   the ZKP including the ZKP that the encrypted data include (1) a public key of the first party, (2) a public key of the second party, and (3) an amount of the fungible token representing the fungible asset or an identifier of the asset token representing the non-fungible asset,
   at least one of the encrypted encryption key or the encrypted data being available to the auditor without a private key of the first party on the ZKP-enabled DLN and a private key of the second party on the ZKP-enabled DLN being provided to the auditor, such that the auditor audits the transaction using the at least one of the encrypted encryption key or the encrypted data.

17. The processor-readable non-transitory medium of claim 16, wherein the encryption key is a symmetric encryption key.

18. The processor-readable non-transitory medium of claim 16, wherein the transaction includes the generation of the asset token representing the non-fungible asset to be transferred from the first party to the second party,
   the data including the public key of the first party, the public key of the second party and/or the identifier of the asset token.

19. The processor-readable non-transitory medium of claim 16, wherein the transaction includes the transfer of the token representing the fungible asset from the first party to the second party,
   the data including the public key of the first party, the public key of the second party and/or the amount of the token being transferred.

20. The processor-readable non-transitory medium of claim 16, wherein the ZKP includes the ZKP that the encrypted data include the data related to the transaction between the first party and the second party.

* * * * *